US012631997B2

(12) United States Patent
Okada

(10) Patent No.: US 12,631,997 B2
(45) Date of Patent: May 19, 2026

(54) CHARGE REMOVING APPARATUS OF SHEET IN IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Hideyuki Okada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/614,487

(22) Filed: Mar. 22, 2024

(65) Prior Publication Data

US 2024/0319649 A1 Sep. 26, 2024

(30) Foreign Application Priority Data

Mar. 25, 2023 (JP) ................................ 2023-049117

(51) Int. Cl.
*G03G 15/00* (2006.01)
*B65H 37/00* (2006.01)
*G03G 15/02* (2006.01)

(52) U.S. Cl.
CPC ......... *G03G 15/5029* (2013.01); *B65H 37/00* (2013.01); *G03G 15/0291* (2013.01); *B65H 2301/5133* (2013.01); *B65H 2801/27* (2013.01)

(58) Field of Classification Search
CPC ........ B65H 2801/27; B65H 2301/5133; B65H 37/00; G03G 15/5029; G06F 3/0488; G06F 3/1237; G06F 3/1253; B41J 11/0015; H05F 3/04
See application file for complete search history.

(56) References Cited

U.S. PATENT DOCUMENTS

| | | | | |
|---|---|---|---|---|
| 11,966,187 | B2 * | 4/2024 | Sugiyama | G03G 15/0291 |
| 12,422,774 | B2 * | 9/2025 | Kanematsu | G03G 15/55 |
| 2008/0290591 | A1 * | 11/2008 | Shimizu | B65H 43/00 271/208 |
| 2021/0216031 | A1 * | 7/2021 | Tanaka | G03G 15/6535 |

FOREIGN PATENT DOCUMENTS

JP H11258881 A 9/1999

* cited by examiner

*Primary Examiner* — Arlene Heredia Ocasio
(74) *Attorney, Agent, or Firm* — Canon U.S.A., Inc. IP Division

(57) ABSTRACT

A method for performing printing while changing a charge elimination setting value for each sheet type subject to printing is disclosed. A method for controlling a printing system includes printing an image on a sheet, acquiring a charge elimination setting value corresponding to a type of the sheet, and performing control to perform charge elimination on the sheet based on the charge elimination setting value.

11 Claims, 8 Drawing Sheets

CHARGE REMOVING APPARATUS OF SHEET IN IMAGE FORMING APPARATUS, METHOD OF CONTROLLING THE SAME, AND STORAGE MEDIUM

BACKGROUND

Field of the Disclosure

The present disclosure relates to a printing system including a charge elimination apparatus, a method for controlling the printing system, and a storage medium.

Description of the Related Art

A recording medium (hereinafter referred to as a "sheet") used in a printing operation is conveyed in an electrostatically charged state with a residual electric charge in an electrophotographic process or an electrostatically charged state caused by slight friction with conveyance rollers or guides during sheet conveyance. This static electricity may cause sheets to stick to each other. In addition, dirt or paper dust adhering to a print product may cause the degradation of its quality.

Plain paper has a low electrical resistance, with which electric charges move easily, providing a small amount of charge, which is quick to disappear. On the other hand, thick paper, synthetic paper, and synthetic resin (plastic) paper, such as coated paper, have a high electrical resistance, with which electric charges cannot move easily. Synthetic paper and coated paper tend to be more charged and retain a residual electric charge. Also, synthetic paper and coated paper are susceptible to the environment, particularly humidity. It is generally known that these types of paper are more likely to be electrostatically charged because of a smaller amount of electric discharge into the air at lower humidity environment.

If a sheet sticking to another goes through post-processing, the sheets can affect sheet arrangement processing, resulting in a degraded quality of the post-processing. In addition, a paper feed or conveyance failure can bring about a paper jam during the post-processing, causing damage to other sheets or the apparatus.

To prevent such a risk from occurring, it is desirable to eliminate, before performing the post-processing, the static electricity of sheets after the printing process. There has been proposed a method for canceling electric charges charged on sheets, by applying a voltage to a pair of conveyance rollers disposed downstream in the sheet conveyance direction (see Japanese Patent Application Laid-Open No. 11-258881).

This charge elimination method with the voltage application to a conveyance roller (hereinafter referred to as a "charge elimination roller") involves applying an electric charge of the polarity opposite to that of an electric charge on a sheet to the sheet via the charge elimination roller to eliminate the static electricity. Thus, charge elimination control with a charge elimination roller (application of an electric charge of the polarity opposite to that of an electric charge on a sheet to a charge elimination roller) needs to be performed according to the amount of charge on the sheet. This is because an optimum charge value for charge elimination depends on the printing environment, such as the humidity and the sheet type. If charge elimination control is performed on a sheet with an inappropriate electric charge adjustment, the sheet can rather be charged, causing the sheet to stick to another. Thus, when performing printing while taking a plurality of sheet types, for example, charge elimination control suitable for each sheet type in use is required.

SUMMARY

According to an aspect of the present disclosure, a printing system includes a printing unit configured to print an image on a sheet, one or more memories, and one or more processors. The one or more memories and the one or more processors are configured to acquire a charge elimination setting value corresponding to a type of the sheet, and perform control to perform charge elimination on the sheet based on the charge elimination setting value.

Further features of various embodiments of the present disclosure will become apparent from the following description of exemplary embodiments with reference to the attached drawings.

DESCRIPTION OF THE EMBODIMENTS

Exemplary embodiments of the present disclosure will be described below with reference to the accompanying drawings.

The following exemplary embodiments do not limit every embodiment within the scope of the appended claims. Not all of the combinations of the features described in the exemplary embodiments are used for the solutions in the present disclosure.

General Configuration

Figure 1:
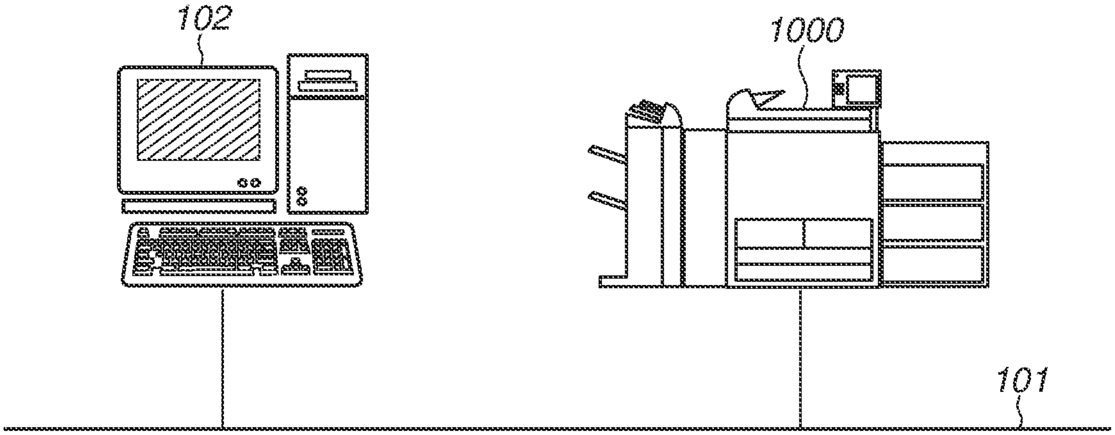
FIG. 1 illustrates a system configuration according to an exemplary embodiment.

FIG. 1 illustrates a simplest configuration of an exemplary embodiment including a printing system 1000 and client computer 102 (hereinafter referred to as a "PC") that are connected to each other via a network 101. The PC 102 is capable of transmitting page description language (PDL) code data as a print job to the printing system 1000 via the network 101.

Hardware Configuration of Printing System

System Block Diagram

Figure 2:
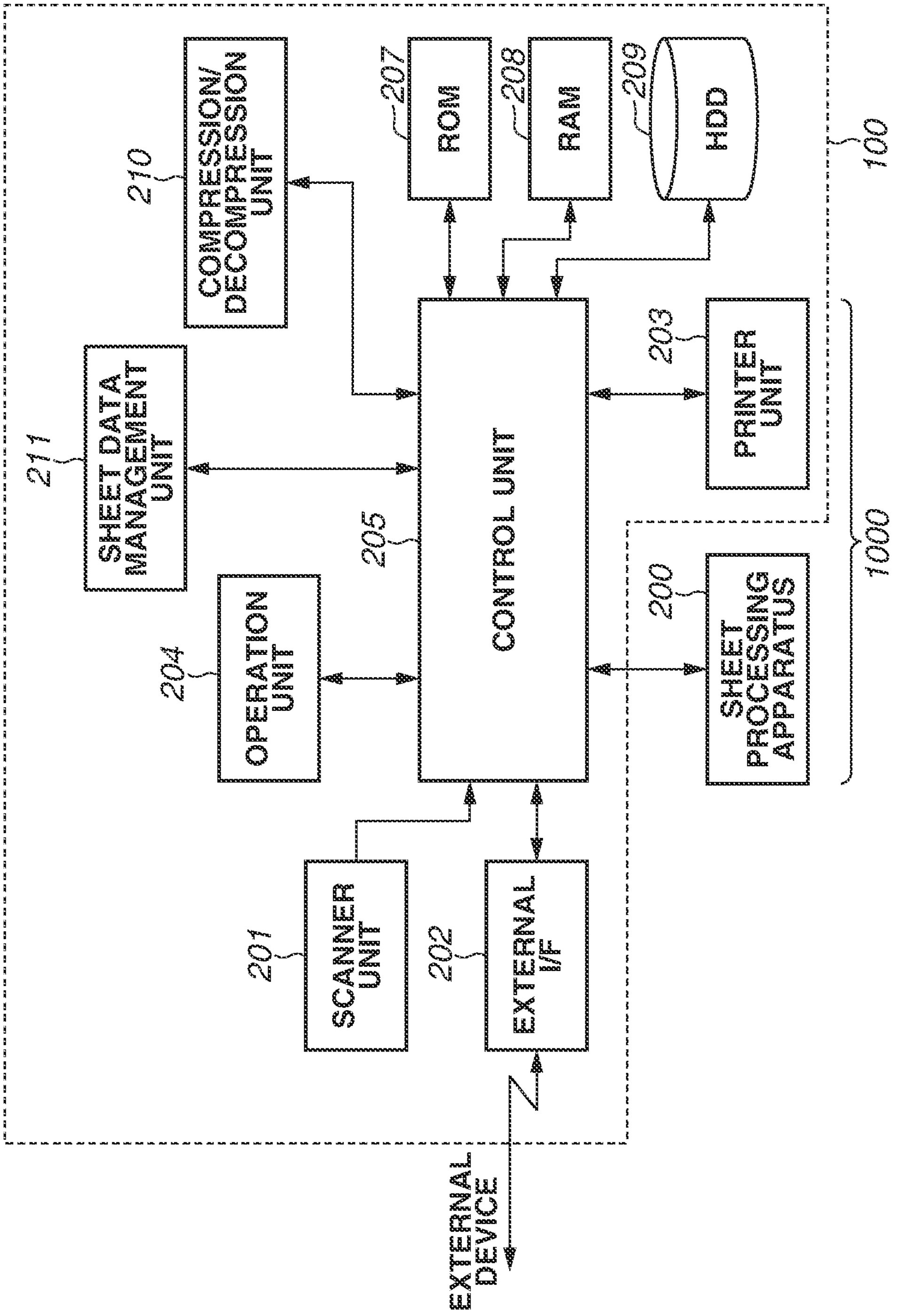
FIG. 2 is a hardware block diagram illustrating a printing apparatus.

The printing system 1000 will be described with reference to the system block diagram in FIG. 2. The printing system 1000 includes a printing apparatus 100 enclosed in dotted line, and a sheet processing apparatus 200. The printing apparatus 100 can be connected to any desired number of sheet processing apparatuses 200. In the present exemplary embodiment, a multi-function peripheral (MFP) with a plurality of functions (including copy and printer functions) will be described as an example of the printing apparatus 100. However, the printing apparatus 100 may be a single function printing apparatus with only a copy or a printer function. According to the present exemplary embodiment, for example, the printing system 1000 is provided with various components (described below).

The printing system 1000 is configured to perform sheet processing on sheets printed by the printing apparatus 100 via the sheet processing apparatus 200 connected to the printing apparatus 100. However, the printing system 1000 may constitute only the printing apparatus 100 without connecting to the sheet processing apparatus 200 thereto. The sheet processing apparatus 200 is configured to communicate with the printing apparatus 100, and receives an instruction from the printing apparatus 100, and performs sheet processing (described below).

A scanner unit 201 reads an image on a document, converts the image into image data, and transfers the image data to another unit.

An external interface (I/F) 202 communicates data with other apparatuses connected to the network 101.

A printer unit 203 prints an image based on input image data on a sheet.

Figure 4:
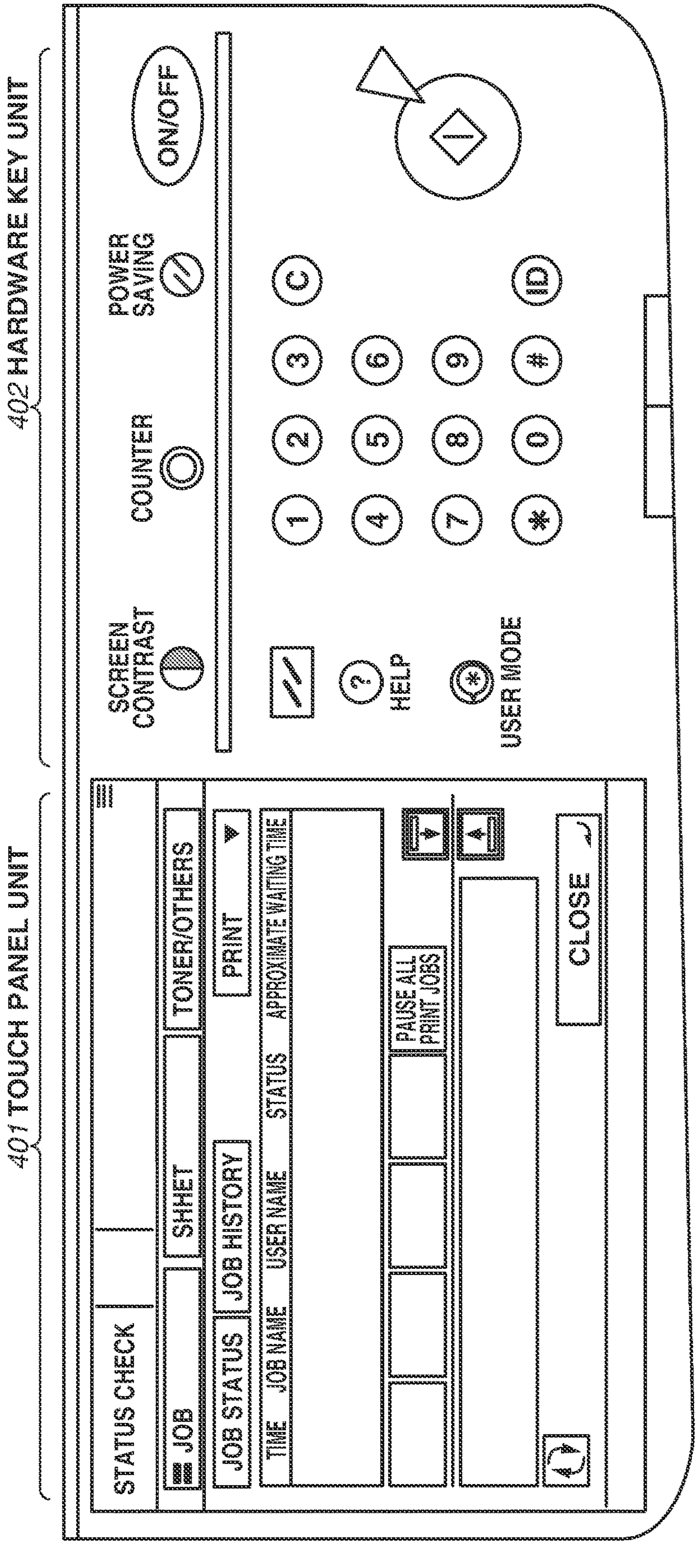
FIG. 4 illustrates an operation unit provided on the printing apparatus.

An operation unit 204 as illustrated in FIG. 4 includes a hardware key input unit (key input unit) 402 and a touch panel unit 401, and receives an instruction from a user via these units. The operation unit 204 displays various pieces of information on the touch panel unit 401 included in the operation unit 204.

A control unit 205 generally controls processing and operations of various units included in the printing system 1000. More specifically, the control unit 205 also controls operations of the printing apparatus 100 and the sheet processing apparatus 200 connected to the printing apparatus 100.

A read only memory (ROM) 207 stores various computer programs to be run by the control unit 205.

For example, the ROM 207 stores programs for causing the control unit 205 to perform various processing in a flowchart (described below) and display control programs for displaying various setting screens (described below). The ROM 207 stores programs the control unit 205 runs through interpretation of PDL code data received from the PC 102 and then rasterization of the PDL code data into raster image data. The ROM 207 also stores other information, such as a boot sequence and font information.

A random access memory (RAM) 208 stores image data and PDL code data transmitted from the scanner unit 201 and the external I/F 202, and various programs and setting information loaded from the ROM 207. The RAM 208 also stores information about the sheet processing apparatus 200 (information about the type and the function of each sheet processing apparatus 200 connected to the printing apparatus 100). The control unit 205 can use information about these sheet processing apparatuses 200 stored in the RAM 208 for control.

A hard disk drive (HDD) 209 includes a hard disk and a drive unit for writing and reading data to and from the hard disk. The HDD 209 is a mass storage device for storing image data input from the scanner unit 201 and compressed by a compression/decompression unit 210.

The control unit 205 can print image data stored in the HDD 209 via the printer unit 203 based on an instruction from a user. The HDD 209 is also used as a spooler. The control unit 205 can manage PDL code data received from the PC 102, as a print job, and store the data in the HDD 209. The control unit 205 can manage print jobs stored in the HDD 209 and acquire the number of stored print jobs and setting information set in the print jobs.

The compression/decompression unit 210 compresses and decompresses image data stored in the RAM 208 and the HDD 209, using various compression methods, such as Joint Bi-level Image Experts Group (JBIG) and Joint Photographic Experts Group (JPEG).

A sheet data management unit 211 manages sheet parameters (grammage, surface property, and fiber orientation) of sheets, and control parameters (voltage adjustment value at transfer, voltage bias value at charge elimination control, etc.) to be used in printing on a sheet, for each sheet type and each sheet brand. While the sheet data management unit 211 is illustrated as a component unit in the block diagram in FIG. 2, the sheet data management unit 211 is a database stored in the HDD 209.

Sheet Database Setting/Registration Screen

Figure 6:
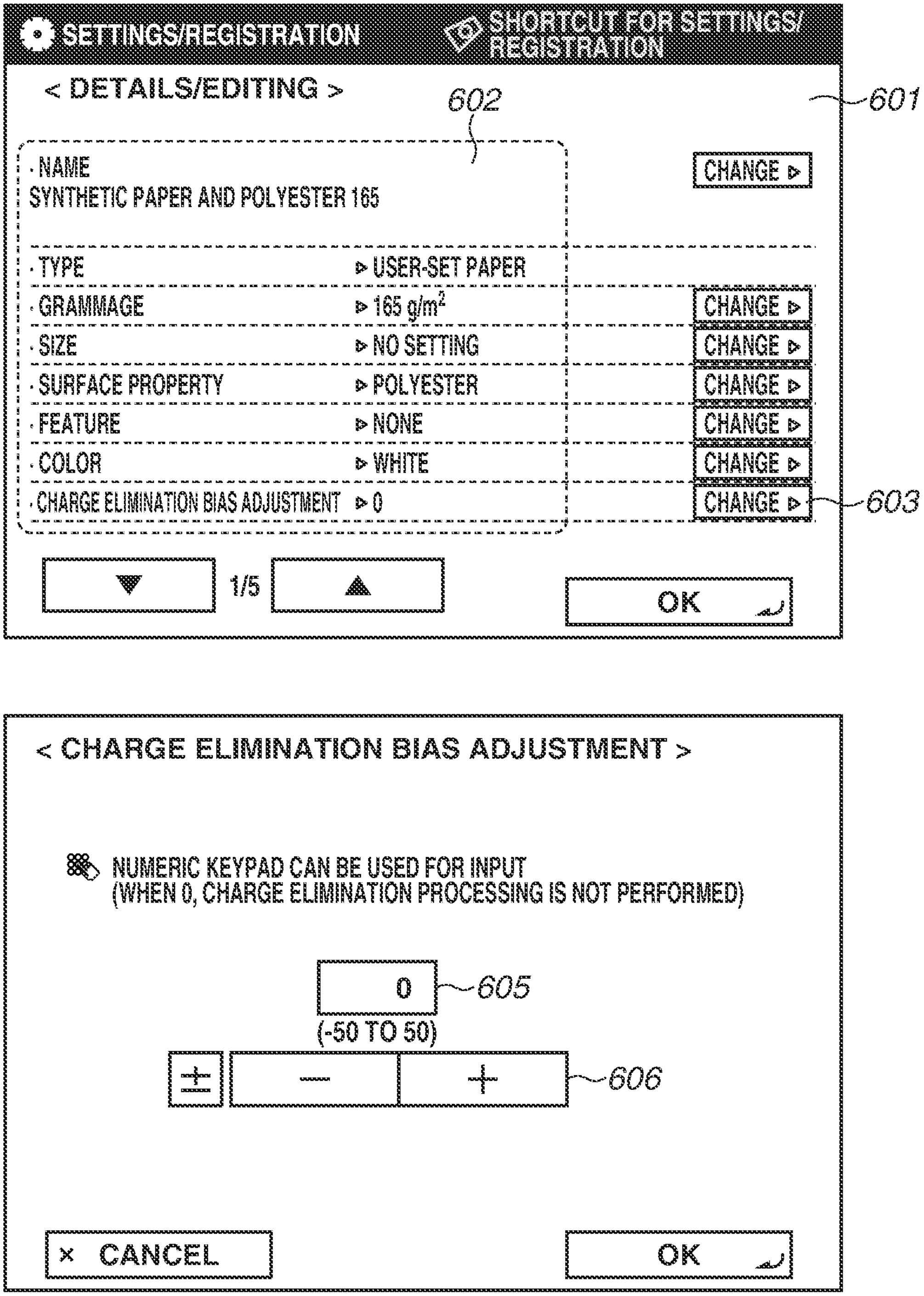
FIG. 6 illustrates sheet database reference and change screens via a sheet data management unit.

The sheet data management unit 211 includes a setting screen for referencing and editing the contents of the database. An example of the screen is illustrated in FIG. 6. The printing system 1000 is configured to allow the user to call a setting screen for each sheet via the operation unit 204.

Upon reception of a call-up instruction, the control unit 205 displays a parameter list screen 601 for a corresponding sheet on the touch panel unit 401 of the operation unit 204. The parameter list screen 601 includes a field 602 for displaying different parameters and their current values, each parameter of which is provided with a [Change] button 603.

For example, if the user presses the [Change] button 603 of the parameter of charge elimination bias adjustment to change the parameter, the control unit 205 displays a charge elimination bias adjustment screen on the touch panel unit 401 of the operation unit 204.

The charge elimination bias adjustment screen includes a field 605 for displaying a current setting and input buttons 606 for incrementing and decrementing a setting value, allowing a user to set a bias voltage for charge elimination processing to be performed by a charge elimination apparatus 200-3*a* (described below). According to the present exemplary embodiment, the user sets the bias voltage for the charge elimination processing not by directly inputting a voltage value [kV] but by setting an intensity level with the positive or negative (+/−) sign in the range from −50 to +50. As an example of an actual operation, the control unit 105 performs control to apply a voltage of 0.1 kV per +1 to a charge elimination roller. The above-described setting value unit and settable range are described as an example and not limited thereto.

Then, the control unit 205 can access the corresponding database via the sheet data management unit 211, making it possible to acquire the feature of the sheet to be used in printing and the corresponding parameters to be used in print control.

Printing Apparatus

Figure 3:
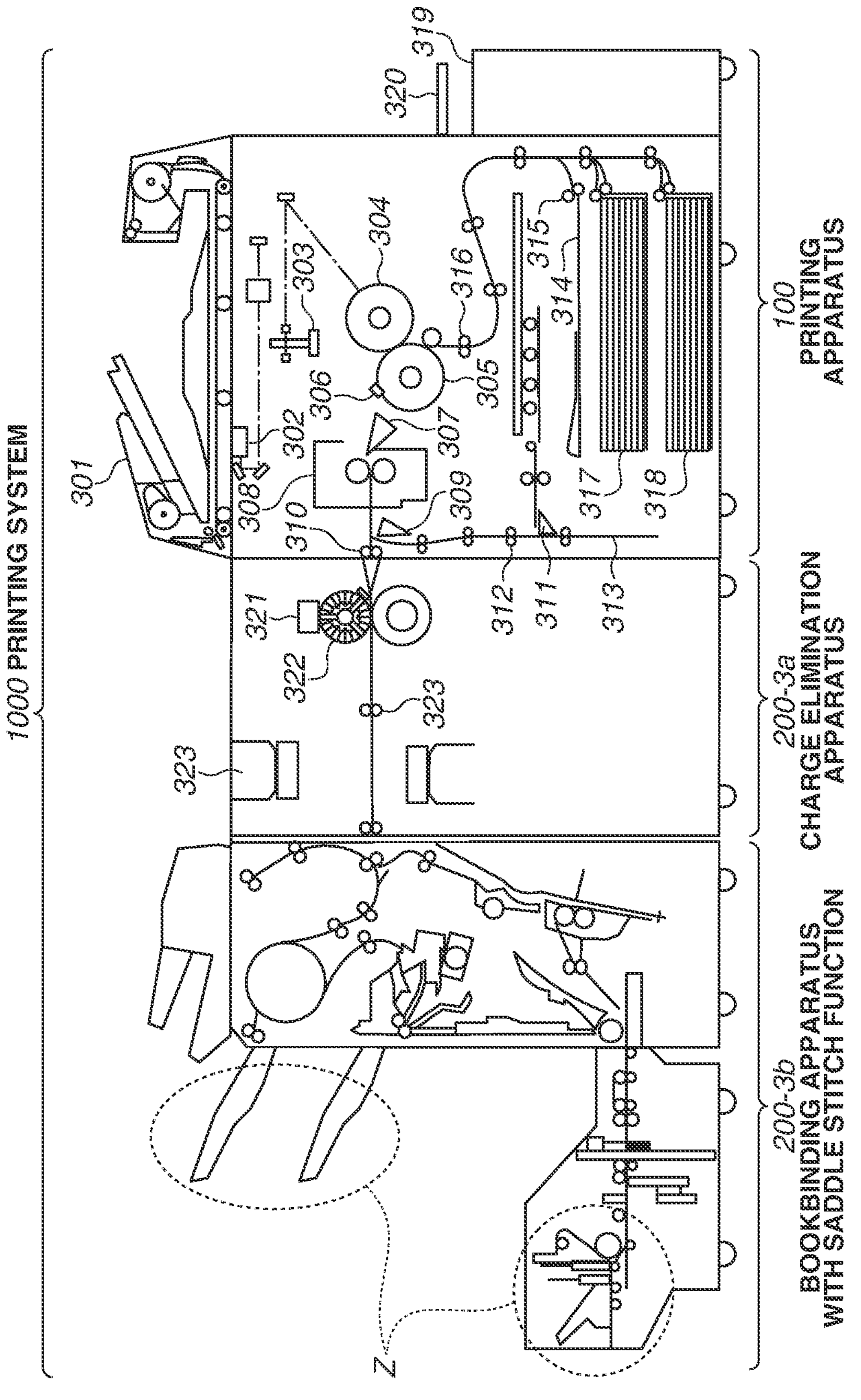
FIG. 3 is a cross-sectional view illustrating a configuration of a printing system.

The configuration of the printing system 1000 will be described with reference to FIG. 3. FIG. 3 is a cross-sectional view illustrating the printing apparatus 100 and the sheet processing apparatus 200 connected to the printing apparatus 100. In FIG. 3, the sheet processing apparatus 200 includes the charge elimination apparatus 200-3*a* and a bookbinding apparatus with a saddle stitch function 200-3*b*.

Firstly, the printing apparatus 100 will be described. An automatic document feeder (ADF) 301 separates a bunch of document sheets set on the stacking surface of the document tray in page order from the first page, and conveys each page onto the document positioning glass for a scanner 302 to scan the document sheets. The scanner 302 reads an image of each document page conveyed onto the document positioning glass and converts the image to image data via a charge coupled device (CCD). A rotating polygon mirror 303 makes light beams, such as a laser beam modulated based on the image data, incident on itself and irradiates a photosensitive drum 304 with the light beams as reflected scanning light via a reflecting mirror. The laser beams form a latent image on the photosensitive drum 304, and the latent image is developed by toner, forming a toner image. The toner image is then transferred to a sheet adhering on a transfer drum 305. The printing apparatus 100 sequentially performs this series of image forming processes for yellow (Y), magenta (M), cyan (C), and black (K) toners in this order to form a full-color image. After the printing apparatus 100 performs the image forming process four times, the sheet with a full color image formed thereon on the transfer drum 305 is separated by a separation pawl 306 and then conveyed to a fixing unit 308 by a pre-fixing carrier 307. The fixing unit 308, including a combination of rollers and a belt and a heat source, such as a halogen heater, melts and fixes the transferred toner on the sheet with heat and pressure. A sheet ejection flapper 309 is swingable about its swing shaft to regulate the sheet conveyance direction. With the sheet ejection flapper 309 swung in the clockwise direction in FIG. 3, the sheet is conveyed straight and ejected out of the apparatus by a sheet ejection roller 310. The control unit 205 controls the printing apparatus 100 to perform one-sided printing in the above-described sequence.

To form images on both sides of a sheet, the sheet ejection flapper 309 swings in the counterclockwise direction in FIG. 3. The sheet conveyance direction is changed to the downward direction, and the sheet is fed to a two-sided conveyance unit. The two-sided conveyance unit includes a reversing flapper 311, a reversing roller 312, a reversing guide 313, and a two-sided tray 314. The reversing flapper 311 swings about its swing shaft to regulate the sheet conveyance direction. In performing a two-sided printing job, the control unit 205 controls the reversing flapper 311 to swing in the counterclockwise direction in FIG. 3 so that the sheet of which the first surface is printed by the printer unit 203 is fed to the reversing guide 313 via the reversing roller 312. Then, the control unit 205 controls the reversing roller 312 to temporarily stop with the trailing edge of the sheet pinched by the reversing roller 312, and controls the reversing flapper 311 to swing in the clockwise direction in FIG. 3, while controlling the reversing roller 312 to rotate in the opposite direction. Thus, the control unit 205 causes the sheet to make a switchback and be conveyed to the two-sided tray 314, and controls to guide the sheet to the two-sided tray 314 with the leading and trailing edges of the sheet reversed. The sheet is once put on the two-sided tray 314 and then fed to a registration roller 316 again by a re-feed roller 315. At this timing, the sheet is fed so that the surface opposite to the first surface subjected to the transfer process will face the photosensitive drum 304. Then, similarly to the above-described process, the control unit 205 performs control to form a second image on the second surface of the sheet. Then, the sheet with the images formed on both sides is subjected to a fixing process and then ejected from the inside of the main body of the printing apparatus 100 via the sheet ejection roller 310 to the outside of the printing apparatus 100. The control unit 205 controls the printing apparatus 100 to perform two-sided printing in the above-described sequence.

The printing apparatus 100 also includes a sheet feed unit for storing sheets used in print processing. The sheet feed unit includes paper cassettes 317 and 318 (each storing 500 sheets), a paper feed deck 319 (storing 5,000 sheets), and a manual feed tray 320. The paper cassettes 317 and 318 and the paper feed deck 319 can store various types of sheets with different sizes and different materials. On the manual feed tray 320, various sheets including special sheets, such as overhead projector (OHP) sheets, can be set.

Charge Elimination Apparatus

Figure 5:
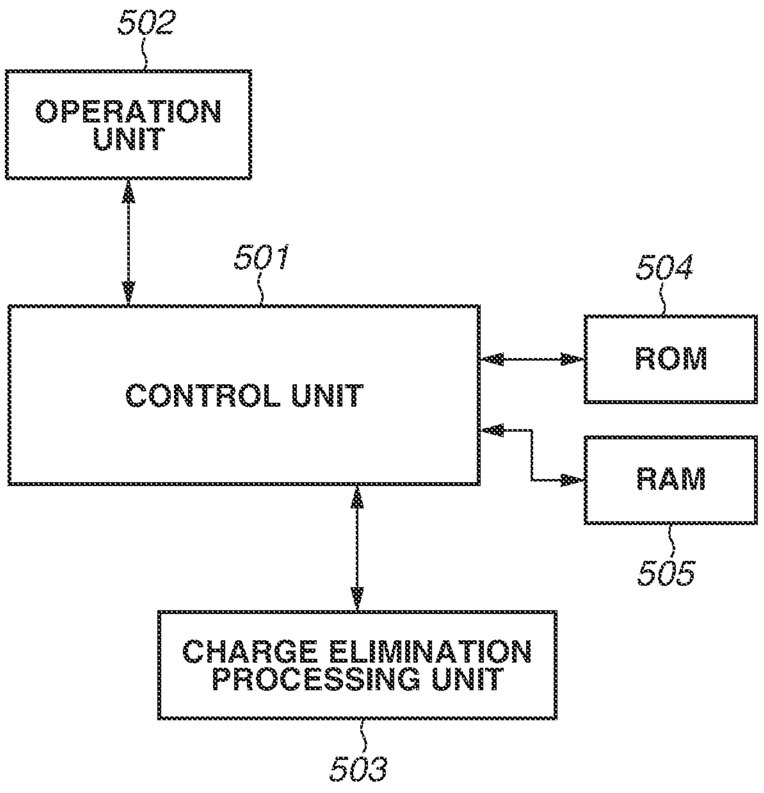
FIG. 5 is a hardware block diagram illustrating a charge elimination apparatus.

The charge elimination apparatus 200-3*a* will be described. FIG. 5 is a system block diagram illustrating the charge elimination apparatus 200-3*a*. The charge elimination apparatus 200-3*a* also includes a control unit 501 as with the printing apparatus 100. The control unit 501 is configured to generally manage the charge elimination apparatus 200-3*a* while communicating with the control unit 205 of the printing apparatus 100 in FIG. 2 via a bus (not illustrated).

A charge elimination processing unit 503 includes a charge elimination roller 322, an ionizer 323, and a voltage application controller 321 for applying voltages to the charge elimination roller 322 and the ionizer 323. These units perform the charge elimination processing on the conveyed sheet. The control unit 501 performs control for applying voltages to the charge elimination roller 322 and the ionizer 323 via the voltage application controller 321.

A ROM 504 stores a boot program of the charge elimination apparatus 200-3*a* and programs for the charge elimination processing on the charge elimination processing unit 503. The control unit 501 loads a necessary program into the RAM 502 from the ROM 504 to run.

The charge elimination processing performed by the charge elimination processing unit 503 will be described in detail with reference to FIG. 7.

Figure 7:
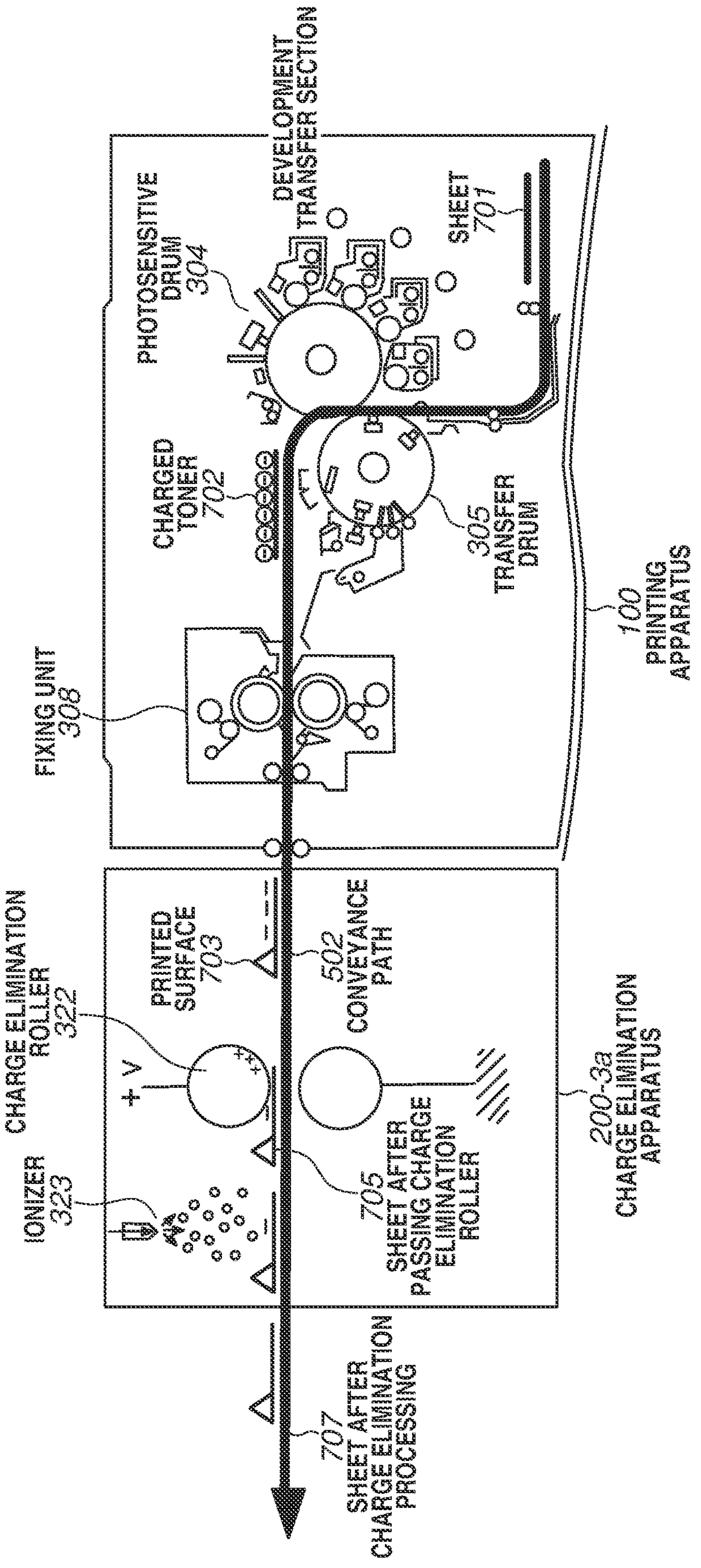
FIG. 7 schematically illustrates charge elimination processing.

FIG. 7 schematically illustrates a state where the charge elimination apparatus 200-3*a* performs the charge elimination processing on a sheet that has undergone the print processing by the printing apparatus 100. Like numbers refer to like components common to those in FIG. 3. A sheet 701 is conveyed to a developing transfer section, including the photosensitive drum 304 and the transfer drum 305, via a conveyance path, and a toner 702 is placed on the sheet 701. The charged toner 702 placed on the sheet 701 is negatively charged. The sheet 701 with the toner fixed thereon by the fixing unit 308 is conveyed to the charge elimination apparatus 200-3*a* while a printed surface 703 is negatively charged. The charge elimination apparatus 200-3*a* including the positively charged charge elimination roller 322 applies a positive electric charge to the negatively charged print surface 703 via contact charge elimination by the roller 322 to resolve the charged state. However, a negative electric charge that has not been eliminated in the charge elimination processing by the charge elimination roller 322 or a reversely charged positive electric charge is assumed to remain on a sheet 705 after the sheet passes the charge elimination roller 322. The charge elimination apparatus 200-3*a* according to the present exemplary embodiment includes the ionizer 323 downstream of the charge elimination roller 322. The ionizer 323 produces corona discharge as ions with a voltage applied to its electrode needle in the charge elimination apparatus 200-3*a* to resolve the charged state. The charge elimination roller 322 performs the rough charge elimination in this way, and the ionizer 323 eliminates a residual electric charge, so that the charged state of the sheet 707 ejected from the charge elimination apparatus 200-3*a* after the charge elimination processing is resolved.

Returning to the description with reference to the cross-sectional view in FIG. 3, the charge elimination apparatus 200-3*a* includes the charge elimination roller 322 and a mating roller. The sheet conveyed to the charge elimination apparatus 200-3*a* is further conveyed while being pinched by both the rollers, and then subjected to the rough charge elimination by the charge elimination roller 322. Then, while the sheet is being conveyed out of the charge elimination apparatus 200-3*a* by a conveyance roller, the sheet is subjected to the residual charge elimination processing by the ionizer 323.

Bookbinding Apparatus With Saddle Stitch Function

The bookbinding apparatus with a saddle stitch function 200-3*b* will be described. Examples of sheet processing by the bookbinding apparatus with a saddle stitch function 200-3*b* include saddle stitch bookbinding, punching processing, cutting processing, shift sheet ejection processing, folding processing, and stapling processing. These jobs are collectively referred to as a "saddle stitch bookbinding job".

When performing a saddle stitch bookbinding job, the control unit 205 causes the bookbinding apparatus with a saddle stitch function 200-3*b* to convey sheets in this job through printing by the printing apparatus 100. Then, the control unit 205 causes the bookbinding apparatus with a saddle stitch function 200-3*b* to perform sheet processing in the job. Then, the control unit 205 causes the bookbinding apparatus with a saddle stitch function 200-3*b* to store the print products in the saddle stitch bookbinding job through the sheet processing by the bookbinding apparatus with a saddle stitch function 200-3*b*, at a sheet ejection destination Z of the bookbinding apparatus with a saddle stitch function 200-3*b*. The sheet ejection destination Z is one of a plurality of sheet ejection candidates. This is because the bookbinding apparatus with a saddle stitch function 200-3*b* can perform a plurality of types of sheet processing using different sheet ejection destinations for the individual pieces of sheet processing. According to the present exemplary embodiment, a description of detailed conveyance procedures of the saddle stitch bookbinding job will be omitted.

Print Processing Procedure

Figure 8:
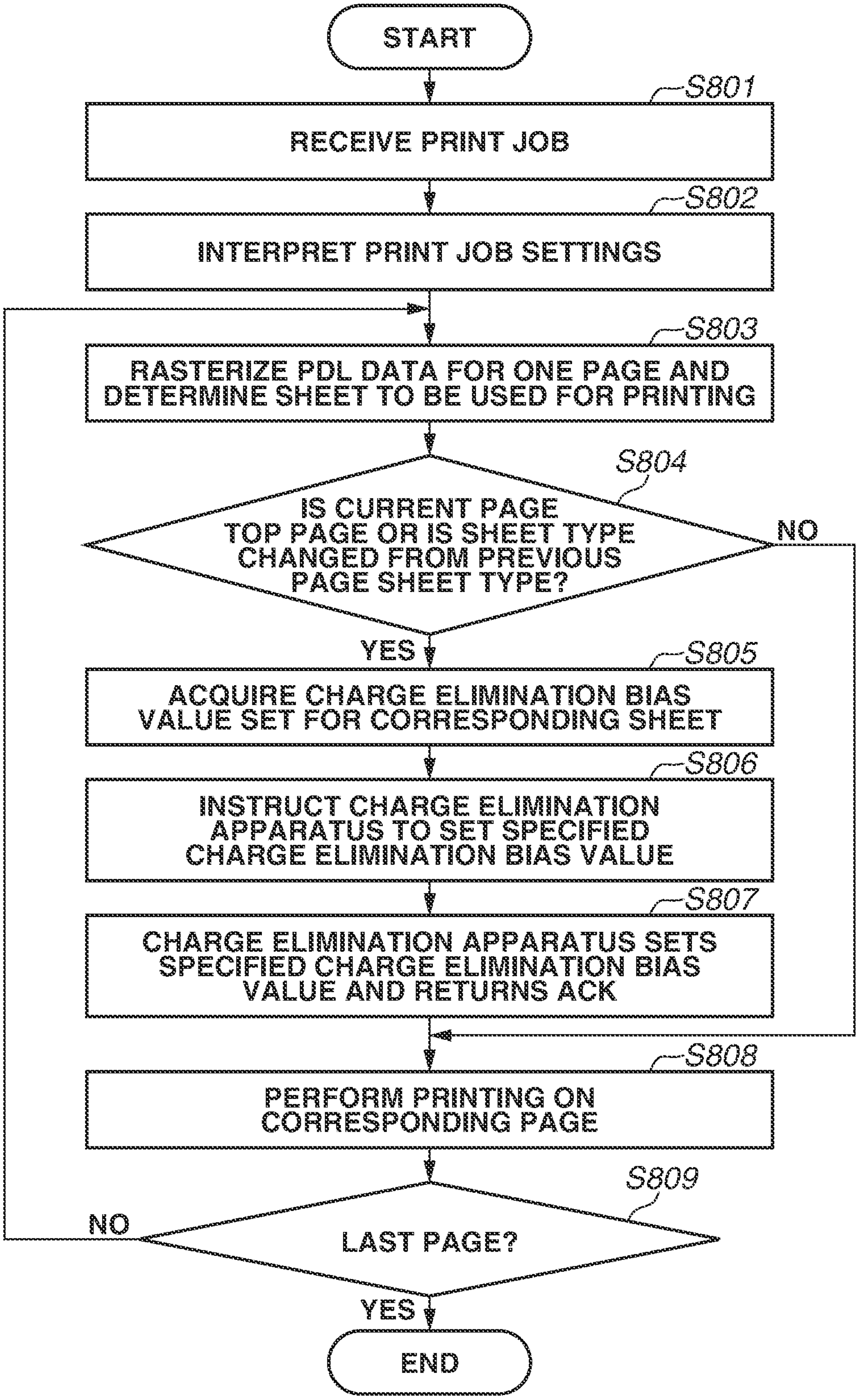
FIG. 8 is a flowchart illustrating charge elimination control execution according to a sheet for each page.

Print processing for a print job with a plurality of mixed sheet types for each of which a charge elimination bias value is used will be described with reference to a flowchart in FIG. 8.

The following processing is carried out when the control unit 205 loads a program stored in the HDD 209 or the ROM 207 into the RAM 208 and then runs the program.

In step S801, the control unit 205 of the printing apparatus 100 receives a print job via the network 101 and the external I/F 202.

In step S802, the control unit 205 interprets the settings of the print job received in step S801, for example, the number of copies to be printed, the sheet ejection destination, and the specified post-processing.

In step S803, the control unit 205 reads PDL data for one page from the spooler, rasterizes the data, and identifies the sheet type to be used to print the page.

In step S804, the control unit 205 determines whether the current in-process page is the top page or whether the sheet type has been changed from that of the immediately preceding page to the determined sheet type in step S803. If the current in-process page is not the top page and the sheet type has not been changed from that of the immediately preceding page to the determined sheet type (NO in step S804), the processing proceeds to step S808. If the current in-process page is the top page or when the sheet type has been changed from that of the immediately preceding page to the determined sheet type (YES in step S804), the processing proceeds to step S805.

In step S805, the control unit 205 acquires the charge elimination bias value corresponding to the determined sheet type from the database via the sheet data management unit 211.

In step S806, the control unit 205 notifies the control unit 501 of the charge elimination apparatus 200-3*a* of the charge elimination bias adjustment value acquired in step S805 and issues an instruction to set the charge elimination bias value for the charge elimination roller 322 to the control unit 501.

In step S807, the control unit 501 of the charge elimination apparatus 200-3*a* applies the charge elimination bias voltage as the charge elimination bias value notified with the setting instruction of the control unit 205 in step S806 to the charge elimination roller 322 via the voltage application controller 321. Then, the control unit 501 notifies the control unit 205 of the printing apparatus 100 of an acknowledgment (Ack) indicating the application of the voltage as the charge elimination bias value specified by the setting instruction. The control unit 205 additionally performs the determination control in step S804 in this way, so that the processing for acquiring print parameters of the target sheet and the processing for the charge elimination bias adjustment are performed only when the current page is the top page or when the sheet type is changed during printing.

Upon reception of the notification of the application of the charge elimination bias voltage from the control unit 501 of the charge elimination apparatus 200-3*a* in step S807, then in step S808, the control unit 205 of the printing apparatus 100 controls the printer unit 203 to print the corresponding page.

In step S809, the control unit 205 determines whether the printed page is the last page of the print job. If the printed page is determined to be the last page (YES in step S809), the processing is completed. If the printed page is determined to be not the last page (NO in step S809), the processing returns to step S803. The control unit 205 continues the processing for the subsequent page(s). Even in a print job including a plurality of different sheet types, the above-described control on each page included in the print job achieves the charge elimination control according to the sheet type of each page.

According to the exemplary embodiment, if the control unit 205 determines that the sheet type has been changed from that of the immediately preceding page to the determined sheet type (YES in step S804), then in step S806, the control unit 205 issues an instruction to set the charge elimination bias value to the control unit 501. However, if the charge elimination bias value acquired in step S805 is equal to the charge elimination bias value for the preceding sheet even with a different sheet type, the control unit 205 may advance the processing to step S808 to perform printing without issuing a setting instruction.

In step S805, the control unit 205 acquires the charge elimination bias value corresponding to the sheet from the database via the sheet data management unit 211. However, the database does not need to be stored in the HDD 209 but may be stored in a device, such as a server on the network.

A method for performing printing on a plurality of different types of sheets with the optimum charge elimination settings by the printing system 1000 that performs the above-described processing will be supplementarily described.

Charge Elimination Bias Adjustment

Carrying out this use case involves making and registering settings of optimum charge elimination bias adjustment values for a plurality of sheet types to be used before printing on them via the sheet data management unit 211. A method will be described for adjusting the voltage bias value in the charge elimination control for each sheet type via the database of the sheet data management unit 211.

According to the present exemplary embodiment, the voltage bias value is manually adjusted by a user. This adjustment method is provided in the form of a use manual used when a user operates the apparatus. Firstly, a user performs printing on an adjustment target sheet. Then, as described above, the printing is performed through the completion of the charge elimination processing based on the charge elimination bias value corresponding to the target sheet in the database at this timing. In the default state where no settings are made, the setting value is 0 (the charge elimination control is not performed). If printing is performed in this state, the charge elimination control will not be applied. Further, in the present exemplary embodiment, an MFP is used as an example of the printing apparatus of the printing system, and the user may perform printing in a copy job using the scanner 302 mounted on the printing apparatus 100.

Then, the user measures the amount of charge of the print sheet output by using a surface potentiometer or an electrostatic potential measuring instrument to check the amount of charge of the print product. Measuring the amount of charge by using these instruments allows the user to learn the numerical value of the specific amount of charge in a voltage (volt) unit. Then, based on the result of the measurement, the user sets a charge elimination bias adjustment value as a sheet parameter for the target sheet via the above-described charge elimination bias adjustment screen 604. In the use manual, the combination of the voltage value [V] of the amount of charge measured and the adjustment value as a guide to eliminate the charge as the value is written as a guide for manual adjustment value setting operation. The user makes settings of the sheet parameters for the target sheet, and then the user performs printing on the target sheet again and then measures the amount of charge in a similar way to the above-described operation.

The user repetitively performs the above-described measurement and parameter value fine-adjustment until the amount of charge of the measured sheet decreases to a sufficiently small value, which allows the user to set and register the charge elimination bias value suitable for the corresponding sheet as the target sheet. Then, after performing this operation for all of the sheets to be used, the user performs printing. Thus, printing on a plurality of sheet types can be performed with the optimum charge elimination bias value settings.

Other Exemplary Embodiments

In the above-described exemplary embodiments, the example has been described where the control unit 205 determines whether the current in-process page is the top page or whether the sheet type has been changed from that of the immediately preceding page to the sheet type determined in step S803. In the example, the description has been that if the current in-process page is the top page or the sheet type has been changed from that of the immediately preceding page to the determined sheet type (YES in step S804), the processing proceeds to step S805. In this example, in step S805, the control unit 205 acquires the charge elimination bias value corresponding to the corresponding sheet from the database via the sheet data management unit 211. In step S806, the control unit 205 notifies the control unit 501 of the charge elimination apparatus 200-3*a* of the charge elimination bias adjustment value acquired in step S805 to issue an instruction to set the charge elimination bias value for the charge elimination roller 322 to the control unit 501. However, some embodiments of the present disclosure are not limited thereto. For example, instead of performing the determination in step S804, the control unit 205 may access the database via the sheet data management unit 211 and then issue an instruction to set the charge elimination bias value set in the sheet information about the sheet of each page to be printed.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has described exemplary embodiments, it is to be understood that some embodiments of the disclosure are not limited to the disclosed exemplary embodiments. The scope of the following claims is to be accorded the broadest interpretation so as to encompass all such modifications and equivalent structures and functions.

This application claims priority to Japanese Patent Application No. 2023-049117, which was filed on Mar. 25, 2023 and which is hereby incorporated by reference herein in its entirety.

What is claimed is:

1. A printing system comprising:

a printer;

a storage;

an interface;

one or more memories that store instructions; and one or more processors that execute a method by executing the instructions stored in the one or more memories, the method comprising:

generating a user interface that displays a first sheet type and a first charge elimination setting value corresponding to the first sheet type, acquiring, via the user interface, a second charge elimination setting value corresponding to the first sheet type, wherein the second charge elimination setting value is different from the first charge elimination setting value, storing the second charge elimination setting value corresponding to the first sheet type in the storage, after storing the second charge elimination setting value corresponding to the first sheet type in the storage, receiving a print job via the interface, controlling the printer to print a first image on a first sheet of the first sheet type according to the print job, and performing control to perform charge elimination on the first sheet based on the second charge elimination setting value.

2. The printing system according to claim 1, wherein performing control to perform the charge elimination on the first sheet based on the second charge elimination setting value includes controlling a charge elimination apparatus to set a setting value of the charge elimination apparatus to the second charge elimination setting value.

3. The printing system according to claim 2, wherein performing control to perform the charge elimination on the first sheet based on the second charge elimination setting value includes, when a top sheet or a sheet type to be used in printing is changed from an immediately preceding sheet, controlling the charge elimination apparatus to set the setting value of the charge elimination apparatus to the second charge elimination setting value.

4. The printing system according to claim 3, wherein performing control to perform the charge elimination on the first sheet based on the second charge elimination setting value includes, when a current in-process sheet is the top sheet and when the sheet type to be used in printing is not changed from the immediately preceding sheet, controlling the charge elimination apparatus to not perform processing of setting the setting value of the charge elimination apparatus.

5. The printing system according to claim 1, wherein the method further comprises:

acquiring, via the user interface, a third charge elimination setting value corresponding to the first sheet type, wherein the third charge elimination setting value is different from the first charge elimination setting value and is different from the second charge elimination setting value; and storing the third charge elimination setting value corresponding to the first sheet type in the storage.

6. The printing system according to claim 1, wherein acquiring, via the user interface, the second charge elimination setting value corresponding to the first sheet type includes:

receiving, via the user interface, a selection of the first sheet type; and after receiving the selection of the first sheet type, receiving a selection of the second charge elimination setting value.

7. The printing system according to claim 1, wherein the first charge elimination setting value and the second charge eliminate setting value are a each a respective charge elimination bias value.

8. The printing system according to claim 1, wherein the user interface further displays a second sheet type and a third charge elimination setting value corresponding to the second sheet type; and wherein the method further comprises:

acquiring, via the user interface, a fourth charge elimination setting value corresponding to the second sheet type, wherein the fourth charge elimination setting value is different from the third charge elimination setting value;

storing the fourth charge elimination setting value corresponding to the second sheet type in the storage;

controlling the printer to print a second image on a second sheet of the second sheet type according to the print job; and performing control to perform charge elimination on the second sheet based on the fourth charge elimination setting value.

9. The printing system according to claim 1, wherein storing the second charge elimination setting value corresponding to the first sheet type in the storage includes deleting the first charge elimination setting value corresponding to the first sheet type from the storage.

10. A method for controlling a printing system, the method comprising:

generating a user interface that displays a first sheet type and a first charge elimination setting value corresponding to the first sheet type;

acquiring, via the user interface, a second charge elimination setting value corresponding to the first sheet type, wherein the second charge elimination setting value is different from the first charge elimination setting value;

storing the second charge elimination setting value corresponding to the first sheet type;

after storing the second charge elimination setting value corresponding to the first sheet type, receiving a print job;

printing a first image on a first sheet of the first sheet type according to the print job; and performing control to perform charge elimination on the first sheet based on the second charge elimination setting value.

11. A non-transitory computer-readable storage medium storing computer-executable instructions for causing a computer to perform a control method for controlling a printing system, the control method comprising:

generating a user interface that displays a first sheet type and a first charge elimination setting value corresponding to the first sheet type;

acquiring, via the user interface, a second charge elimination setting value corresponding to the first sheet type, wherein the second charge elimination setting value is different from the first charge elimination setting value;

storing the second charge elimination setting value corresponding to the first sheet type;

after storing the second charge elimination setting value corresponding to the first sheet type, receiving a print job;

printing a first image on a first sheet of the first sheet type according to the print job; and performing control to perform charge elimination on the first sheet based on the second charge elimination setting value.

* * * * *